Patented Feb. 19, 1929.

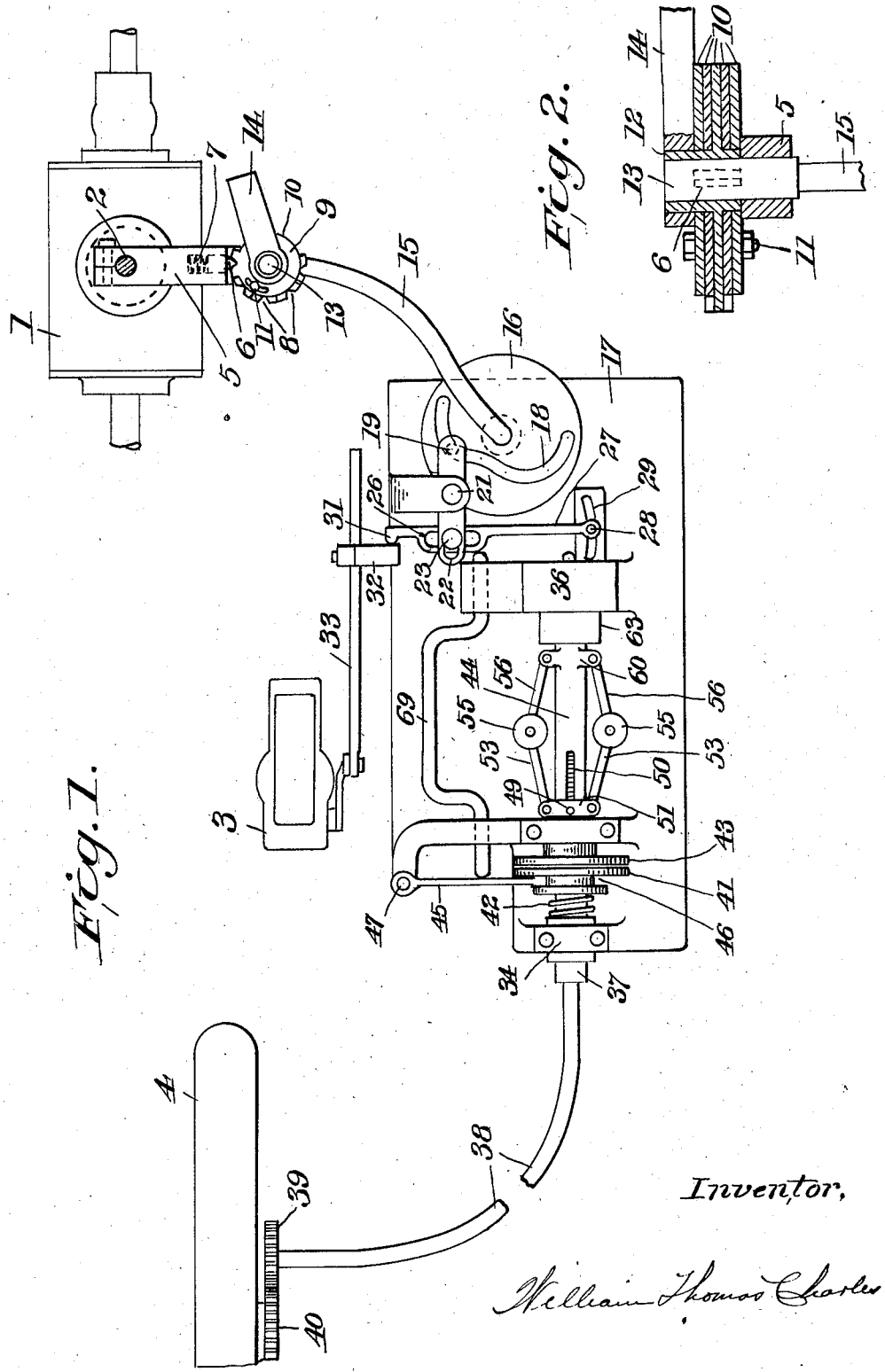

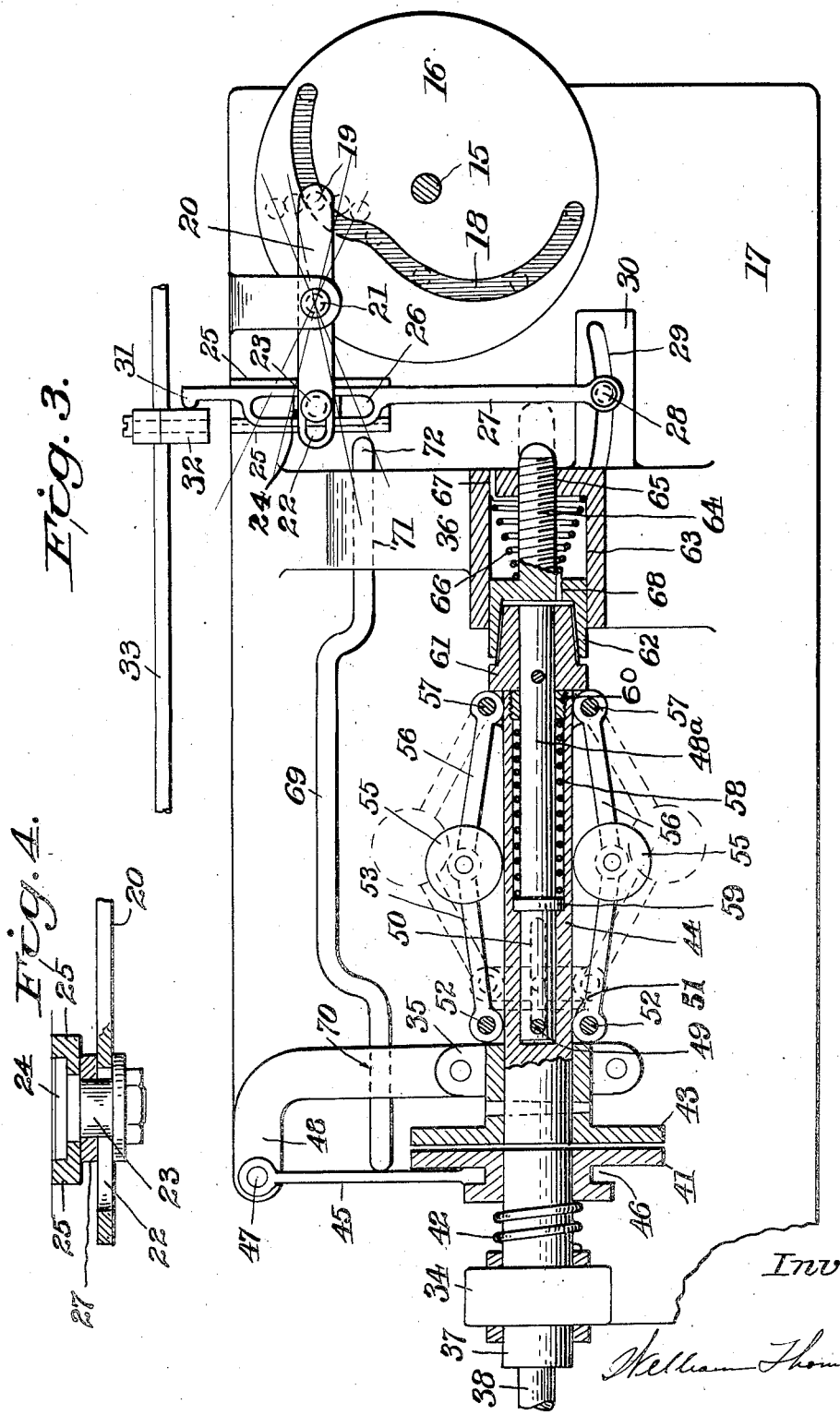

1,702,721

UNITED STATES PATENT OFFICE.

WILLIAM THOMAS CHARLES, OF WASHINGTON, DISTRICT OF COLUMBIA.

SYNCHRONIZING MOTOR-VEHICLE TRANSMISSION GEARS.

Application filed August 25, 1926. Serial No. 131,457.

This invention relates to devices for synchronizing the gears in the gear box, of a motor vehicle transmission, and has for its object the production of an automatic synchronizing mechanism.

Another object of this invention is to provide means wherbey any shift of gears can be performed while a vehicle is in motion at any speed of which it is capable while in gear. Another object of this invention is to provide means whereby the gears may be shifted without disengaging the clutch.

Another object of this invention is to provide a mechanism simple in construction, easily attached, and independent of the gear shift should it become inoperative.

Another object of this invention is to provide a means whereby the gears are synchronized in a minimum amount of time with positive degree of accuracy.

The present invention has been designed to prevent damaging the gearing in the transmission gear box, especially in trucks, passenger busses and railroad vehicles, where shifting of gears occurs frequently.

The accompanying drawings show one practical embodiment of my invention, but it must be understood that I do not limit myself to the exact construction shown on the drawing, as various modifications may suggest themselves to those skilled in mechanical art without departing from the spirit or intent of my invention.

In the accompanying drawings, which form a part of these specifications:—Figure 1 is a general arrangement in plan view showing my invention applied to a motor vehicle, the gear box, carbureter and front wheel being shown diagrammatically.

Figure 2 is an enlarged sectional view showing the construction of the notched disks for setting the controlling cam of my invention.

Figure 3 is an enlarged sectional view of the governor and governor shaft, with the controlling cam and variable lever shown in plan view, and Figure 4 is a detailed cross-sectional view through the movable pivot of the variable lever.

Like characters of reference designate corresponding parts in the several figures of the drawings.

In the drawings an automobile transmission case is shown at 1. The gear shifting lever 2, the carbureter 3 and the front wheel 4 are parts common in most all makes of motor vehicles. Secured to the shifting lever 2 is a bracket 5 provided with a plunger 6 backed by a spring 7. The plunger 6 engages notches 8 of a manually operated member 9, said member being built up of a series of disks 10, bolted together as at 11, for the purpose of adjusting the disks 10 with respect to each other in order to vary the distance between the notches 8, to accommodate various makes of motor vehicles.

The centrally located disk of the member 9 is provided with a hub 12, said hub being mounted upon a shaft 13 which is free to rotate in the bracket 5. A suitable operating handle 14 is also secured to the hub 12 for moving said member 9 against the locking action of the plunger 6. Secured to the shaft 13 is a flexible shaft 15, the flexible shaft at its opposite end has mounted thereon the controlling cam 16 of my invention.

The cam 16 is also rotatably mounted on a base plate 17 and is provided with an operating groove 18 which engages a pin 19 on a lever 20 pivoted at 21 to a bracket secured to the base plate 17. The lever 20 at its opposite end is provided with a slot 22 which engages a pivot stud 23 mounted upon a slide 24 which moves in guides 25 mounted upon the base plate 17. The pivot 23 also passes through an elongated slot 26 in a variable lever 27, whose endwise movement is limited by a guiding pin 28 engaging a curved slot 29 in a bracket 30 attached to the aforementioned base plate 17.

The variable lever 27 has a projection 31 at its free end, which engages an abutment 32 attached to the accelerating rod 33 of the carbureter 3.

Mounted upon the base plate 17 are bearing brackets 34 and 35 and a bracket 36. The bracket 34 forms a bearing for a short shaft 37 which is attached to one end of a flexible shaft 38 the opposite end of which is mounted in a pinion 39 engaging a gear 40 on the wheel 4. The opposite end of short shaft 37 has secured thereto one disk member 41 of a clutch. A spring 42 is provided for forcing the disk 41 into engagement with the disk 43 mounted upon one end of a governor shaft 44.

A lever 45 engaging a groove 46 acts to disengage the clutch members 41 and 43 when said lever is moved upon its pivot 47 mounted on a bracket 48 of the base plate 17.

The governor shaft 44 is hollow and surrounds an inner sliding shaft 48ª, connected to rotate with the shaft 44 by a pin 49 engaging slots 50 in the shaft 44. The pin 49 at its ends engages a collar 51 to which is pivoted at 52 the arms 53 of the governor, secured to the governor weights 55, the oppositely disposed governor arms 56 are secured to lugs at 57, said lugs being rigidly attached to shaft 44.

The shaft 48ª as will be seen by a perusal of Figure 3 of the drawings, has a sliding movement endwise within the shaft 44, and as the speed of the shaft 44 increases the governor will tend to force the shaft 48ª outwardly from the end of shaft 44 against the action of the spring 58 which engages a collar 59 on shaft 48ª and a retaining nut 60 screwed into the end of shaft 44. Secured to the end of shaft 48ª is the male member 61 of a cone clutch, said member 61 engaging the complementary member 62, which slides and rotates in a guide 63 formed by the bracket 36. The member 62 is provided with a threaded extension 64 engaging a threaded opening 65 at the rear end of the guide 63. A spring 66 is secured to the bracket 36 at 67 and to the clutch member 62 at 68. The purpose of the spring 66 is for returning the clutch member 62 to its normal position, when the clutch member 61 has been withdrawn by the governor 55. A slide bar 69 moving in guides 70 and 71 in the brackets 35 and 36 respectively operates the lever 45, for disengaging the clutch members 41 and 43, when said slide bar 69 has been forced endways by the lever 20 which engages the end 72 of said slide bar when not active. The slide bar will be returned by the spring 42 forcing the clutch members 41 and 43 into engagement when moved to any desired shift.

The operation of my invention is as follows: The cam 16 is rotated for the desired shift of gears through the flexible shaft 15 by the member 9 under the influence of the manually operated handle 14. As the cam 16 is rotated the groove 18 definitely sets the lever 20 through its engaging pin 19 for the desired shift. The movement of the lever 20 locates the pivot 23 of the variable lever 27 in its proper position. The vehicle is travelling under its power and the projection 64 on the clutch member 62 is forced a certain distance to engage variable lever 27, the amount of movement of the lever 27 depending upon the action of the governor due to the speed of the vehicle. The opposite end of variable lever 27 through its projection 31 engaging the abutment 32 on the accelerator rod 33 causes the engine to come to the same speed as that of the motor vehicle, or rather the drive shaft gears in the gear box to rotate at the same speed as the driven shaft gears are rotating with which they are to be engaged by the idler of the transmission shift. By examination of Figure 3 of the drawings it will be seen that the movable pivot 23 may be so placed by action of the cam groove 18 that the movement of the variable lever 27 against the accelerator rod 33 may in some cases be almost negligible under the action of the governor shaft, whereas a shifting of said pivot 23 to the opposite end of slot 26 may make the movement of the variable lever against the accelerator rod under the action of the governor considerable.

Assuming that a motor vehicle has three speeds corresponding to the ratio of the gears, namely low, intermediate, and high, the natural order of shifting being from low to intermediate, and from intermediate to high. Since it is necessary that the clutch shaft of a motor vehicle travel at a corresponding speed to make the various shifts the driving ratio decreases as the speed ratio increases necessitating a slowing down of the motor vehicle clutch shaft as the gears are shifted from low to intermediate and intermediate to high. This order will be reversed, shifting from high to intermediate and from intermediate to low ordinarily. The above method involves disengagement of the clutch for each shift of gears.

In shifting with my invention the clutch remains engaged, remove manual control from the accelerator, throw your shifting lever to neutral position, simultaneously turning the handle 14 until the plunger 6 engages the notch corresponding to the shift you desire to make. The gears will now become automatically synchronized by the action of my invention as disclosed in the drawings, in a short period of time, and remain indefinitely at any speed above idling speed. The shifting lever may now be moved engaging the gears desired.

My invention now only saves wear on the gears and also damage to them, but also saves the time lost in slowing up the vehicle by throwing out the clutch in order to make the shift.

Having thus described my invention, what I claim is:

1. The combination with a motor vehicle including shiftable transmission gearing and accelerator means having an operating shaft for controlling the speed of the motor for the vehicle; of apparatus for synchronizing the speed of the engine with the forward speed of the vehicle for any desired gear shift of the transmission, including a lever provided with a movable pivot axis and operatively engageable with the accelerator shaft for actuation thereof, manually operable selector means for shifting the pivotal axis of the lever to vary the throw thereof, and governor actuated means operatively controlled by the forward speed of the vehicle for imparting movement to said lever for causing the speed of the engine to bear a timed relation to the forward speed of the vehicle relative to the selected gear shift.

2. The combination with a motor vehicle including shiftable transmission gearing and accelerator means having an operating shaft for controlling the speed of the motor for the vehicle; of apparatus for synchronizing the speed of the engine with the forward speed of the vehicle for any desired gear shift of the transmission, including a lever provided with a movable pivot axis and operatively engageable with the accelerator shaft for actuation thereof, a manually operated selector cam, means operable by the cam for shifting the pivotal axis of the lever to vary the throw thereof, and governor actuated means embodying a longitudinally movable member operatively controlled by the forward speed of the vehicle for imparting movement to said lever for causing the speed of the engine to bear a timed relation to the forward speed of the vehicle relative to the selected gear shaft.

3. The combination with a motor vehicle including shiftable transmission gearing and accelerator means having an operating shaft for controlling the speed of the motor for the vehicle; of apparatus for synchronizing the speed of the engine with the speed of the vehicle for any desired gear shift of the transmission, including a lever having a movable pivot axis and operatively engageable with the accelerator shaft for actuation thereof, manually operable selector means for shifting the pivotal axis of the lever to vary the throw thereof, governor means, drive means for the governor means and operatively controlled by the forward speed of the vehicle, a rotatable screw fed member operable by the governor means and engageable with said lever for actuation thereof to bring the speed of the engine into conformity with the forward speed of the vehicle relative to the selected gear shift, and means for retracting said screw fed member from engagement with the lever when the governor means is idle.

4. The combination with a motor vehicle including shiftable transmission gearing and accelerator means having an operating shaft for controlling the speed of the motor for the vehicle; of apparatus for synchronizing the speed of the engine with the speed of the vehicle for any desired gear shift of the transmission, including a lever having a movable pivot axis and operatively engageable with the accelerator shaft for actuation thereof, manually operable selector means for shifting the pivotal axis of the lever to vary the throw thereof, governor means operable by the forward speed of the vehicle and embodying a shaft movable longitudinally upon operation of the governor means, a flexible drive shaft connected for rotation upon travel of the vehicle, clutch means between the drive shaft and governor means, means operable by said shaft and engageable with said lever for imparting movement thereto for bringing the speed of the engine into conformity with the forward speed of the vehicle relative to the selected gear shift, and clutch release means operatively disposed between the clutch means and selector means and operable for releasing the clutch thru actuation of the selector means when the desired gear shift is completed.

5. In mechanism for synchronizing the drive and driven gears of shiftable motor vehicle transmissions for synchronizing the speed of the engine with the forward speed of the vehicle, the combination of a rotatable shaft embodying inner and outer telescoping sections, means for rotating the outer shaft section in accordance with the forward speed of the vehicle, governor arms connecting the inner and outer shaft sections for imparting longitudinal movement to the inner shaft section upon rotation of the outer shaft section, a lever having a movable pivot axis and operable for varying the speed of the engine to conform with the forward speed of the vehicle relative to the selected gear shift, manually operable selector means for shifting the pivotal axis of the lever, and a rotatable screw bolt operable by the inner shaft section for imparting movement to said lever.

6. In mechanism for synchronizing the drive and driven gears of shiftable motor vehicle transmissions, the combination with a lever having a movable pivot axis and operable for controlling the speed of the motor for the vehicle, and manually operable selector means for shifting the pivotal axis of the lever to vary the throw thereof; of governor means operable upon travel of the vehicle, embodying a cylinder provided with a closed end having an axially disposed threaded opening, a member slidably and rotatably mounted in the cylinder including a head portion having a conical clutch seat and a threaded shank portion threaded thru the opening in said cylinder, a spiral spring encircling said shank portion with one end anchored in said head portion and its opposite end anchored in the end wall of the cylinder for rotating the said member in one direction, to move the head portion away from the closed end wall, a rotatable shaft including inner and outer telescopic sections mounted co-axially of the said member, a conical clutch head carried by the outer end of the inner shaft section for clutching relation with said conical clutch seat, and governor arms operatively connecting the inner and outer shaft sections for imparting longitudinal movement to the inner shaft section and moving the clutch head thereof into clutching relation with the conical clutch seat for imparting rotation to said member mounted in the cylinder whereby the threaded shank portion thereof will be moved longitudinally for imparting movement to said lever.

7. In apparatus of the class described the combination with a governor controlled accelerator actuating lever having a movable pivot axis, and cam acting selector means for shifting the pivotal axis of the lever, of a selector device embodying a series of superposed adjustable discs having notched circumferential edges, plunger means engageable in the notches for yieldably retaining the discs against rotation, and a flexible coupling shaft between the selector device and selector means.

In testimony whereof I affix my signature.

WILLIAM THOMAS CHARLES.